(12) United States Patent
Warren

(10) Patent No.: US 12,106,652 B2
(45) Date of Patent: Oct. 1, 2024

(54) TRAVEL ABROAD STUDENT SAFETY TRACKING SYSTEM AND DASHBOARD

(71) Applicant: Morgan State University, Baltimore, MD (US)

(72) Inventor: Kimberly R. Warren, Woodstock, MD (US)

(73) Assignee: Morgan State University, Baltimore, MD (US)

( * ) Notice: Subject to any disclaimer, the term of this patent is extended or adjusted under 35 U.S.C. 154(b) by 40 days.

(21) Appl. No.: 18/066,991

(22) Filed: Dec. 15, 2022

(65) Prior Publication Data

US 2023/0186747 A1    Jun. 15, 2023

Related U.S. Application Data

(60) Provisional application No. 63/289,907, filed on Dec. 15, 2021.

(51) Int. Cl.
*G08B 21/02* (2006.01)
*H04W 4/029* (2018.01)

(52) U.S. Cl.
CPC ........ *G08B 21/0269* (2013.01); *H04W 4/029* (2018.02)

(58) Field of Classification Search
CPC .......................... G08B 21/0269; H04W 4/029
See application file for complete search history.

(56) References Cited

U.S. PATENT DOCUMENTS

| | | | |
|---|---|---|---|
| 10,638,298 B1* | 4/2020 | Di Domenico | G06N 20/00 |
| 2012/0214443 A1* | 8/2012 | Daigle | G06Q 20/32 |
| | | | 455/411 |
| 2013/0268886 A1* | 10/2013 | Sureshkumar | ............... |
| | | | G06Q 10/063116 |
| | | | 715/810 |
| 2020/0302480 A1* | 9/2020 | Busch | G06Q 30/0256 |

* cited by examiner

*Primary Examiner* — Brian Wilson
(74) *Attorney, Agent, or Firm* — Whiteford, Taylor & Preston, LLP; Peter J. Davis

(57) ABSTRACT

A student traveler security and experience enhancement system having GPS tracking devices, student traveler mobile devices with student traveler security and experience enhancement mobile applications loaded thereon, security video cameras mounted in locations frequented by student travelers, a student traveler security and travel experience enhancement dashboard configured to allow student and parent users to monitor and review student locations and travel history, communicate securely between users, review and store travel photographs and video, and load, review and store journal entries.

5 Claims, 1 Drawing Sheet

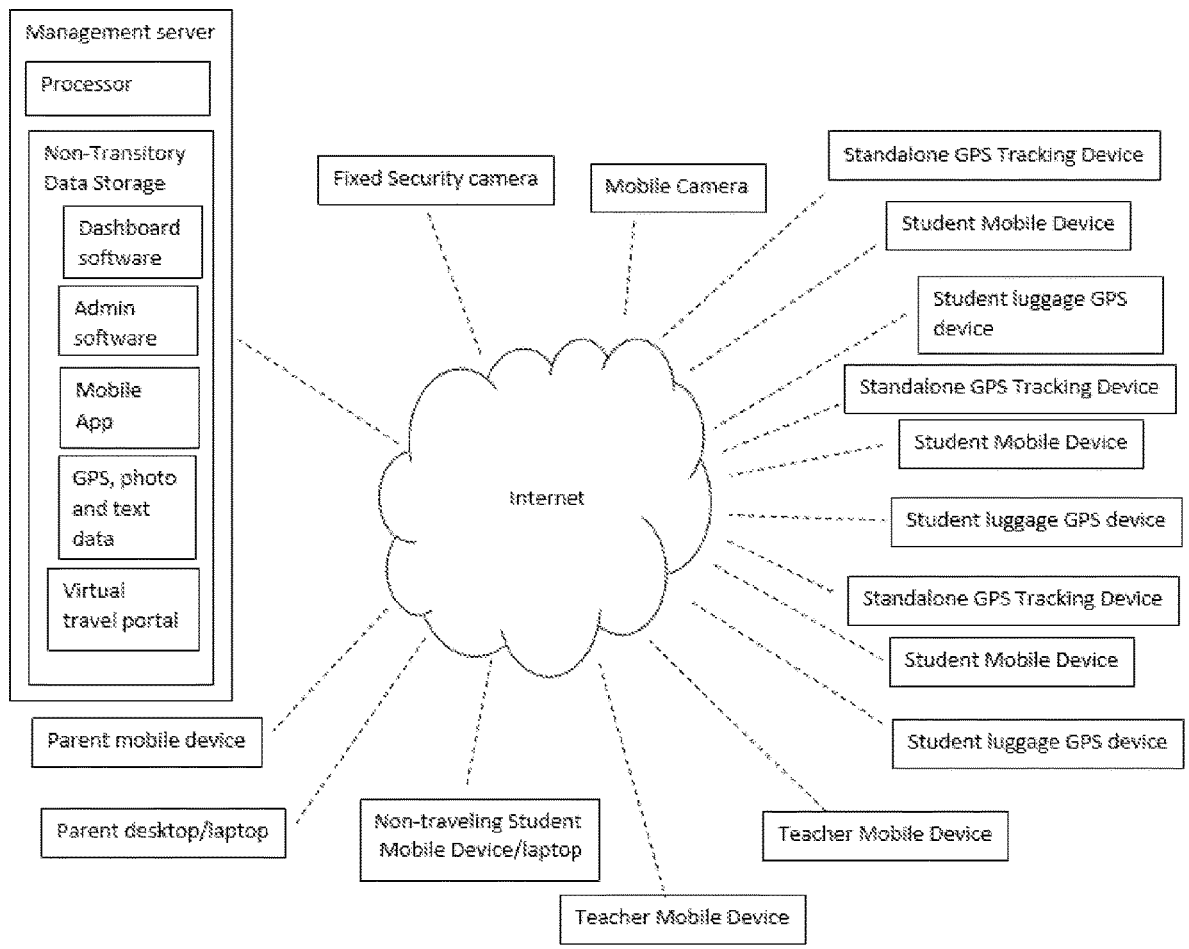

TRAVEL ABROAD STUDENT SAFETY TRACKING SYSTEM AND DASHBOARD

BACKGROUND OF THE INVENTION

FIELD OF THE INVENTION

The present invention relates to systems and methods for monitoring the location and safety of students traveling abroad.

SUMMARY OF THE INVENTION

The invention is a system that deploys communications, social networking, and monitoring to enhance safety and confidence in study abroad programs. More particularly, the invention is a platform designed to enhance student safety for study abroad programs to enhance the safety for students and comfort level for students' families, allowing them to travel and continue to make a study abroad program an attractive educational option.

This system for student safety serving study abroad students and other associated people is managed through a dashboard that provides a number of functions.

GPS tracking devices can be easily attached to a student's lanyard to provide location and other derivative information. A GPS Location Tracker of this type can utilize Cellular, WiFi and GPS for accurate location of kids, elderly, pets, luggage, etc. A typical GPS tracker would be in the form of a lightweight SIM card. The tracking device will also have domestic and worldwide coverage with precise tracking.

Dashboards will have the ability to track iOS and Android enabled phones.

Software functions include the ability to create custom departure and arrival notifications to-and-from home or other locations; with a press of a button, the location is broadcast via app notification, email or text. Geofence zones can be set up with custom alerts when the GPS vehicle tracker enters or exits pre-defined areas.

Outdoor surveillance cameras will be utilized in multiple locations of the study abroad location. Cameras can be installed in common areas where the students spend large amounts of time, including inside the school, on the school grounds, or in other common areas. The platform is able to retain archival data, which is enabled by hard drives, USB drives, and/or remote access via WiFi or by other means. Camera operation is active during both day and night, including night vision capability for constant monitoring. Access to cameras is available through the internet and the video is available on an app that can be downloaded.

The dashboard includes real-time survey and journaling features for students to share their experiences with others (students, family, loved ones). Parents/students will have access to real time video postings and video playback made by traveling students. Surveys will provide a virtual feedback loop in which modifications to the program can be made based on student feedback. The surveys may be used to improve all aspects of the program including the comfort and safety of the students as well as the quality of the experiences.

The dashboard can also provide for interaction with a larger community of parents and other individuals who can discuss study abroad-related activities, either through a social media application within the platform, chat/text function, or through images or video.

BRIEF DESCRIPTION OF THE DRAWINGS

The foregoing summary, as well as the following detailed description of the preferred invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a representation of an embodiment of the invention.

DETAILED DESCRIPTION OF THE INVENTION

Referring to FIG. 1, the components of the invention preferably include a management server, GPS tracking devices, student user mobile devices, student mobile app, parent mobile and desktop web interface, standalone vicinity video cameras, and optionally mobile body camera.

The management server includes non-transient data storage containing computer readable instructions for driving and controlling communications among the various other internet-capable components of the invention. The management server also includes software for driving administrator and user interface webpages. The management server may also include one or more downloadable mobile app modules which users may download to their mobile devices directly via the user interface webpages or indirectly from a mobile app store. The management server also may include a database configured to store data in the form of GPS locations, communications, photographs and videos captured by the various other components of the invention. Alternatively, the management server may be configured to offload some or all such data to cloud servers. In various embodiments, features, functions and/or modules described in connection with the management server may be carried out by a single server, or by a distributed computing arrangement across a plurality of computer servers. In every configuration, the management server is preferably constantly connected to all other components of the invention via the internet.

The standalone GPS tracking devices according to the invention may be in the form of a lightweight SIM card having domestic and worldwide precise location tracking. Each standalone GPS tracking device has a unique identifier which is associated in the management server with the student traveler to which it is issued. Each student traveler user is issued at least one standalone GPS tracking device which is preferably designed to be kept with the student traveler's student identification in a transparent pouch which the student traveler is required to keep on their person at all times, usually hanging about the student traveler's neck by a lanyard. The precise location of each standalone GPS tracking device may be accessed by the management server according to well-known GPS protocols, and the management server may be configured to ping the location of the GPS tracker as often as required by user and/or administrator settings and as permitted system hardware, data storage and bandwidth limitations. Each student traveler may optionally be issued additional standalone GPS tracking devices for pieces of luggage, laptop computers, articles of clothing and/or other valuable assets. According to a preferred embodiment, the student traveler may assign each additional GPS tracking device to a particular item using their mobile app so that the user can individually track each item having a GPS tracking device secured thereto and associated therewith.

The student user mobile devices and mobile apps according to the invention may be standard mobile telephone devices of the type in standard use as of this writing, which have telephone, email, SMS messaging, GPS, camera, and video camera capabilities as well as manifold other computing, processing and data storage functions and capabilities depending on the various mobile applications loaded thereon. According to the present invention, there is presented a student traveler security and experience enhancing mobile application in wireless communication with the management server and configured to track the location of the mobile device using the device's onboard GPS device/system, reflect the location of the standalone GPS tracking device(s) of the invention registered to that student user as captured by the management server and compare it to the location of the device's onboard GPS device/system, capture and organize student user photographs, video and journal entries of his/or her travels, and chat over a secure connection, preferably via the management server, with other traveling students, travel administrators, and family at home. The management server also preferably backs up all communications, images, and other data collected by the student user with the student traveler security and experience enhancing mobile app on their mobile device.

For additional security, various embodiments of the invention may also include video cameras mounted in areas that the student travelers will be known to frequent, including classrooms, dormitory lounges, dining areas, recreational areas, and travel accommodations, such as busses and shuttles. According to preferred embodiments, the video feed from such video cameras may be sent to, stored in and/or retrieved from the management server for access by authorized personnel, including students, administrators and student families. According to a further optional embodiment, the invention may include body-mounted video cameras worn by instructors, chaperones and/or tour guides, and the like. As with the fixed video cameras, the video feeds for body-mounted video cameras may be sent to, stored in and/or retrieved from the management server for access by authorized personnel, including students, administrators and student families.

There is further provided according to the invention a security, location and experience dashboard that the student travelers and authorized users (e.g., parents) can use to record, review and explore the student travelers' experiences. The dashboard may be accessible from the student traveler's mobile app, as well as from an optional parent mobile app or desktop web interface. The dashboard can be configured to show the student traveler's precise location, a history of locations, including travel routes, accompanying video and photographs, student journal entries, and communications with fellow travelers, travel administrators/teachers, and parents.

According to a further optional aspect of the invention, there may be provided a mobile app and/or desktop portal for non-traveling students for an immersive "Virtual Travel From Home" feature. In this embodiment, the "Virtual Travel From Home" embodiment may have the locator and other security functions inactivated or unavailable, but the non-traveling student user may otherwise have access to traveling students photos and journal entries (subject to appropriate permissions from each traveling student). In addition, the "Virtual Travel from Home" embodiment may also feature educational, language, cultural and travel-related materials, articles, news links, photos and videos focused on various travel destinations. Furthermore, where a travel abroad program may include classroom time, the "Virtual Travel from Home" feature may include live or taped classroom feeds.

Various embodiments of the invention may also include a survey feature that the management server and/or mobile app may serve to the student traveler periodically and/or at the end of the travel prompting the student traveler and/or parents to answer various questions to be used in improving user experience and security.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure and defined according to the broadest reasonable reading of the claims that follow, read in light of the present specification.

The invention claimed is:

1. A student travel safety tracking and experience enhancement system comprising:
    a student travel safety tracking and experience enhancement management server including a processor and non-transient memory connected to a wide area network;
    a plurality of stand-alone GPS tracking devices in wireless communication with said student travel safety tracking and experience enhancement management server via said wide area network, each of said stand-alone GPS tracking devices associated in said student travel safety tracking and experience enhancement management server to an individual student traveler;
    a plurality of student traveler mobile computing and communication devices, each of said plurality of student traveler mobile computing and communication devices having installed thereon a student security and travel experience mobile application in communication with said student travel safety tracking and experience enhancement management server via said wide area network;
    a plurality of video security cameras mounted in areas frequented by said student travelers, said plurality of video security cameras in wireless communication with said student travel safety tracking and experience enhancement management server;
    said non-transient memory having stored thereon computer readable instructions for:
    receiving and storing in said non-transient memory location data from said stand-alone GPS tracking devices;
    receiving and storing in said non-transient memory video data from said plurality of video security cameras and from said student traveler mobile computing and communication devices;
    securely managing text communications between different student travelers and between student travelers and parents;
    generating and publishing to said student security and travel experience mobile application and to a parent mobile device or desktop web interface a student traveler security and travel experience dashboard configured to allow said student travelers and parents to view and/or monitor said student traveler's current and historical location, footage from said plurality of video security cameras, travel history, uploaded videos and photographs, journal entries and survey responses.

2. The student travel safety tracking and experience enhancement system according to claim 1, said computer readable instructions further comprising instructions for:

hosting an educational travel portal for non-traveling students comprising educational, language and travel-related links, information, articles, photos and videos for various travel destinations.

3. The student travel safety tracking and experience enhancement system according to claim 2, wherein said educational travel portal for non-traveling students further comprises permission-based access to traveling student photos, videos and journal entries.

4. The student travel safety tracking experience enhancement system according to claim 2, wherein said educational travel portal for non-traveling students further comprises access to live and/or saved classroom instruction.

5. The student travel safety tracking experience enhancement system according to claim 2, wherein said educational travel portal for non-traveling students further comprises a chat functionality for communication between non-traveling students and traveling students.

\* \* \* \* \*